No. 725,612. PATENTED APR. 14, 1903.
G. C. CALENTINE.
CRUTCH.
APPLICATION FILED JUNE 18, 1902.
NO MODEL.
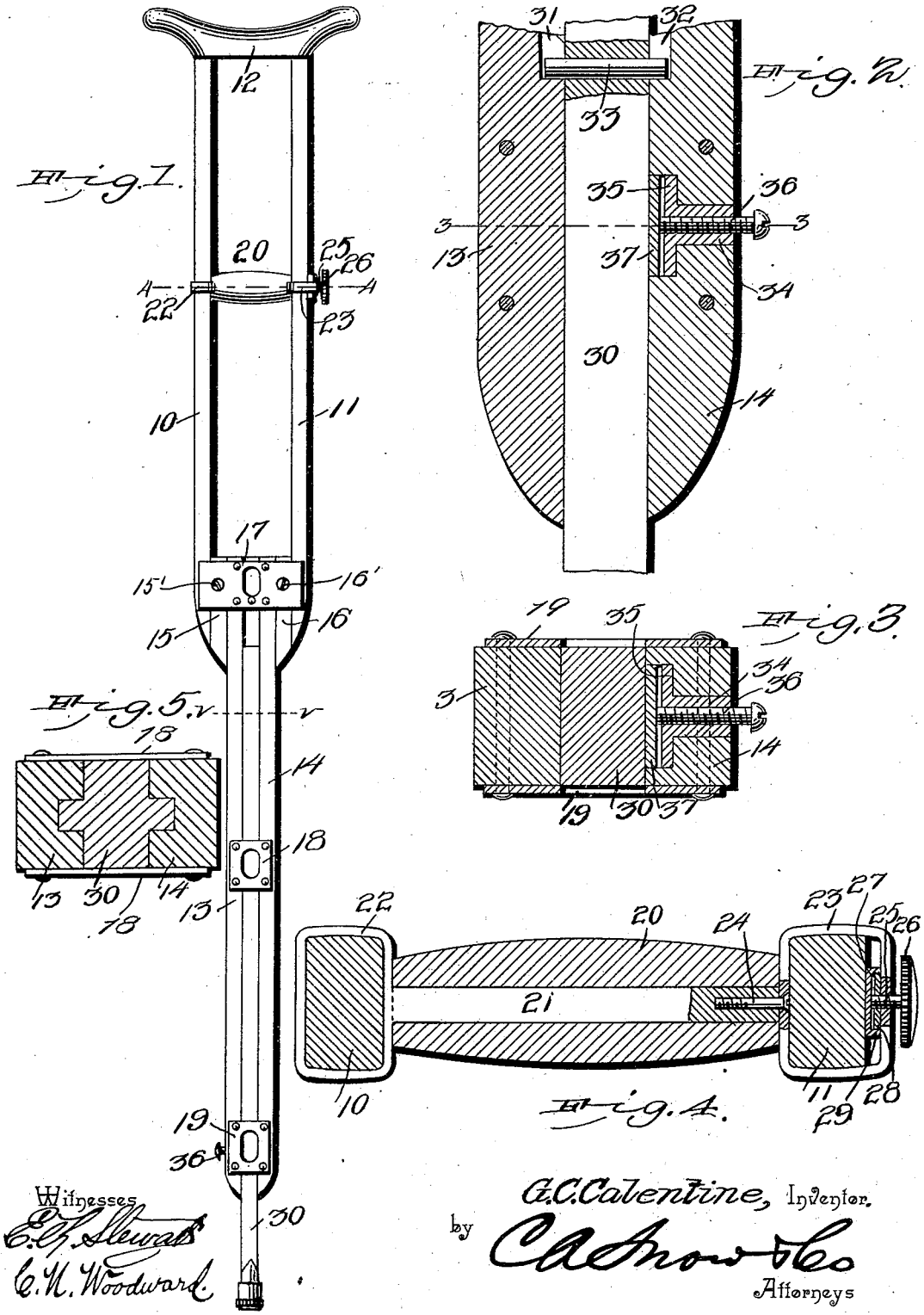

UNITED STATES PATENT OFFICE.

GEORGE C. CALENTINE, OF TACOMA, WASHINGTON, ASSIGNOR OF ONE-HALF TO JOHN C. DONNELLY, OF TACOMA, WASHINGTON.

CRUTCH.

SPECIFICATION forming part of Letters Patent No. 725,612, dated April 14, 1903.

Application filed June 18, 1902. Serial No. 112,209. (No model.)

*To all whom it may concern:*

Be it known that I, GEORGE C. CALENTINE, a citizen of the United States, residing at Tacoma, in the county of Pierce and State of Washington, have invented a new and useful Crutch, of which the following is a specification.

This improvement relates to crutches employed by cripples and invalids, and has for its object the production of an implement which is capable of adjustment both as to the total length of the crutch and also as to the position of the hand-grip, whereby the crutch may be adjusted to any-sized person.

Another object of the invention is to produce an implement simple in construction and combining lightness with strength, durability, and readiness of adjustment and small expense.

The invention consists in certain novel features of the construction, as hereinafter shown and described, and specified in the claims.

In the drawings illustrative of the invention, Figure 1 is a side view of the device complete. Fig. 2 is an enlarged sectional detail of the leg adjustment. Fig. 3 is a transverse section on the line 3 3 of Fig. 2. Fig. 4 is a transverse section through the hand-grip on the line IV IV of Fig. 1. Fig. 5 is a transverse section, enlarged, on the line V V of Fig. 1.

The invention comprises two principal portions, the upper portion supporting the shoulder-rest and having the adjustable hand-grip and the lower portion carrying the adjustable "leg," the whole formed, preferably, of wood, as light as may be consistent with the requisite strength. The upper portion consists of spaced side members 10 11, connected at their upper ends by the shoulder-rest 12 and united at their lower ends to spaced guide members 13 14, the latter closer together than the side members 10 11, as shown. The side members 10 11 are united firmly to the side members 13 14, preferably by the coupling portions 15 16, which are fastened by means of bolts or screws 15' 16', and they are further secured by metal clips 17. The side members 13 14 will be further secured by similar metal clips 18 19, suitably distributed throughout their lengths, as shown. These clips 17 18 19 will be arranged in opposite pairs and attached to opposite sides of the members 13 14, as by rivets or screws, as indicated, passing through the clips and the members 13 14. By this means all the stationary members of the device are firmly secured together and suitably braced and supported and adapted to withstand the severe strains to which these implements will be subjected.

Slidably secured between the members 10 11 is an adjustable hand-grip formed of a central stock 20, longitudinally perforated and adapted to receive a transverse bar 21, the latter provided at one end with a clip 22, embracing one of the members 10 or 11, as the case may be, and the other end of the bar provided with a similar clip 23, movably connected to the bar 21, as by a clamp-screw 24, the clip 23 embracing the opposite member 10 or 11, as the case may be. By this means, it will be noted, the hand-grip 20 is free to slide vertically upon the members 10 11, but cannot be removed therefrom unless the shoulder-rest 12 be removed.

Tapped through the outside of the clip 23 is a clamp-screw 25 and having a milled finger-wheel 26 on its outer end and engaging a disk 27 by its inner end, the latter adapted to be compressed by the screw against the outer face of the adjacent member 10 or 11, as the case may be.

Attached to the inner face of the outer side of the clip 23 is a disk 28, concentric with the aperture for the screw 25, and the disk 27 is provided with a flange 29, embracing this disk, so that the disk 28 serves as a guide to retain the disk 27 in place. By this simple means a gripping means is provided, by which the clip 23 and its attached hand-grip 20 may be firmly connected to the members 10 11 and readily adjusted thereon to adapt the hand-grip to the length of the arm of the user of the crutch.

The friction-disk 27 is an important feature of the invention, as the strains are thereby distributed over a comparatively large area of the surface of the members 10 11, so that not only is the force of the "grip" greatly increased, but the wear upon the wood of the members 10 11 is greatly decreased. By this simple means also the grip 20 may be secured in position by the exercise of much less force upon the screw 25, so that a material reduction in the strains upon the parts is thereby secured.

The spaced members 13 14 form guides between which the movable leg member 30 slides vertically.

The inner surfaces of the members 13 14 are provided with vertical grooves, (indicated at 31 32,) and transversely inserted through the upper end of the leg member 30 is a pin 33, projecting by its ends into the grooves 31 32, whereby the latter form guides for the leg 30, as will be readily understood. By this arrangement the leg member 30 is guided and supported by the coaction of the pin 33 and grooves 31 32 and by the clip-plates 18 19.

Inserted into one of the side members 13 or 14, as the case may be, preferably opposite the lower clip-plates 19, is a stud 34, having an enlarged internal head 35 and internally screw-threaded to afford means for the reception of a clamp-screw 36.

Between the enlarged end 35 and the leg member 30 is a wear-disk 37, with which the inner end of the clamp-screw 36 engages and by which the pressure is imparted to the leg member, and thereby distributed over a larger surface, so that not only is the friction-surface and the strength of the grip increased, but the wear upon the leg member is greatly decreased. By this simple grip mechanism it will be readily understood the leg member may be adjusted longitudinally between the side members 13 14 and firmly gripped at any desired point to adapt the crutch to the height of the user.

The "tip" of the crutch may be provided with any of the usual spurs, cushions, or other attachments usually employed upon crutches.

The members 10 11 and 13 14 may be of any suitable size or material to insure the requisite strength, while at the same time being made as light as possible consistent with the severe strains to which they will be subjected.

The shoulder-rest may be attached in any suitable manner by clips or screws, while the coupling between the upper and lower sections, as at 15 and 16, will be properly secured by bolts or screws 15' 16' to enable them to withstand the strains to which they will be subjected.

The implement may be varied in construction to suit the varying conditions and tastes of the user and may be ornamented and "finished" in any fanciful design or color, and the parts may be modified in minor particulars without departing from the principle of the invention or sacrificing any of its advantages.

Having thus described my invention, what I claim is—

1. A crutch comprising an upper section formed of parallel spaced side members and carrying a shoulder-support, a lower section formed of contracted parallel spaced side members, coupling means between the adjacent ends of said sections, transverse clips connecting said lower-section members, a leg slidably disposed between said lower-section members and supported laterally by said clips, and clamping means between said leg members and said lower-section members, whereby said leg members may be adjustably supported between said lower-section members, substantially as described.

2. A crutch comprising an upper section having a shoulder-support and the lower section formed of spaced longitudinal members having longitudinal guideways in their adjacent faces, a leg member having transverse projections for movably engaging said guideways, means for retaining said leg member laterally in position with relation to said spaced members, and clamping means adapted to adjustably support said leg member in longitudinal relations to said spaced members, substantially as described.

3. A crutch comprising an upper section having a shoulder-support and the lower section formed of spaced longitudinal members having longitudinal guideways in their adjacent faces, a leg member movably engaging said spaced members and with transverse projections engaging said guideways, oppositely-disposed transverse clips engaging said spaced members and inclosing said leg member, and means for adjustably connecting said leg member to said spaced members, substantially as described.

4. A crutch comprising an upper section having a shoulder-support and a lower section formed of spaced longitudinal members transversely connected, a leg member movably engaging said spaced members, an internally-threaded stud with an enlarged inner end and engaging a recess in the interior of one of said spaced members, a clamp-screw engaging said stud, and a wear-plate within said recess and between said clamp-screw and said leg member, substantially as described.

5. A crutch comprising an upper section formed of spaced side members and carrying the shoulder-support upon their upper ends and united into a leg member at their lower ends, a transverse bar having a fixed clip upon one end engaging one of said spaced members and a movable clip upon the other end engaging the other of said spaced members, a hand-grip member upon said bar between said spaced side members, and a clamp-screw tapped through said movable clip and adapted to be forcibly engaged with the adjacent side member, whereby said hand-grip is adjustably connected to said spaced side members, substantially as described.

6. A crutch comprising an upper section formed of spaced side members carrying a shoulder-support upon their upper ends and united into a leg member at their lower ends, a transverse bar having a fixed clip upon one end engaging one of said spaced members and a movable clip upon the other end engaging the other of said spaced members, a hand-grip member upon said bar between said spaced side members, a clamp-screw tapped through said movable clip, a guide-plate upon said movable clip concentric with said clamp-screw, and a wear-plate having a flange engaging said guide-plate and adapted to be compressed by said clamp-screw in engagement with the adjacent spaced side member, substantially as described.

7. A crutch comprising an upper section having a shoulder-support, a lower section having an opening through the length thereof and longitudinal guideways formed in the opposite walls of said opening, a leg member provided with transverse projections for slidably engaging said guideways, and means for adjustably connecting said leg member to said lower section.

In testimony that I claim the foregoing as my own I have hereto affixed my signature in the presence of two witnesses.

G. C. CALENTINE.

Witnesses:
P. C. KAUFFMAN,
F. P. HOSHELL, Jr.